United States Patent [19]
Yankielun et al.

[11] Patent Number: 6,100,700
[45] Date of Patent: Aug. 8, 2000

[54] BRIDGE SCOUR DETECTION AND MONITORING APPARATUS USING TIME DOMAIN REFLECTOMETRY (TDR)

[75] Inventors: Norbert E. Yankielun, Lebanon, N.H.; Leonard J. Zabilansky, Perkinsville, Vt.

[73] Assignee: U.S. Army Corps of Engineers, as represented by the Secretary of the Army, Washington, D.C.

[21] Appl. No.: 09/019,422

[22] Filed: Feb. 5, 1998

[51] Int. Cl.[7] ............... G01R 31/11; G01R 27/04; H04B 11/00; H04B 17/00
[52] U.S. Cl. ............... 324/534; 324/533; 324/642; 367/131; 367/13
[58] Field of Search ............... 324/534, 535, 324/527, 532, 533, 642, 644; 367/131, 13

[56] References Cited

U.S. PATENT DOCUMENTS

| | | | |
|---|---|---|---|
| 2,707,267 | 4/1955 | Gavin | 324/533 |
| 3,617,996 | 11/1971 | Herbert | 367/105 |
| 3,686,887 | 8/1972 | Bruce | 405/15 |
| 3,727,128 | 4/1973 | McFerrin | 324/533 |
| 3,991,364 | 11/1976 | Wiznerowicz | 324/533 |
| 4,291,204 | 9/1981 | Crick | 324/534 |
| 4,855,966 | 8/1989 | Cinquino | 367/97 |
| 4,914,394 | 4/1990 | Meyer | 324/533 |
| 5,032,794 | 7/1991 | Ridd et al. | 324/365 |
| 5,349,327 | 9/1994 | Waters | 340/540 |
| 5,361,776 | 11/1994 | Samuelson et al. | 600/547 |
| 5,479,724 | 1/1996 | Nahajski et al. | 33/719 |
| 5,532,687 | 7/1996 | Richardson et al. | 340/870.33 |
| 5,554,936 | 9/1996 | Mohr | 324/682 |
| 5,784,338 | 7/1998 | Yankielun et al. | 367/131 |
| 5,790,471 | 8/1998 | Yankielun et al. | 367/131 |
| 5,841,289 | 11/1998 | Yankielun et al. | 324/643 |

*Primary Examiner*—Safet Metjahic
*Assistant Examiner*—Jermek M. Hollington
*Attorney, Agent, or Firm*—Luther A. Marsh

[57] ABSTRACT

An apparatus for detecting and monitoring scouring of a bed of sediment beneath a body of water uses time-domain reflectometry (TDR) to measure the level of sediment adjacent to underwater sensors. The apparatus includes an electrical pulse generator which produces and intermittently transmits a series of electrical pulses along a permanent transmission line arranged adjacent to the area of concern, a timer to measure the travel time of the pulses within the transmission lines, a transmitter for transmitting a radio signal corresponding to the travel times of the pulses, a receiver for receiving the signal, and a signal analyzer which interprets the signal to determine a measurement of scouring. Knowledge of the position of the interfaces before and after a scouring event and the dielectric constants of the surrounding media allows the user to detect and monitor the level of erosion caused by scouring.

6 Claims, 4 Drawing Sheets

BRIDGE SCOUR DETECTION AND MONITORING APPARATUS USING TIME DOMAIN REFLECTOMETRY (TDR)

BACKGROUND OF THE INVENTION

The present invention relates to a bridge scour detection and monitoring apparatus and, more particularly, to a time domain reflectometry (TDR) system for real-time detection and monitoring of sediment levels around the submerged foundation of a structural member such as a bridge.

Bridge scour is a severe problem that costs millions of dollars in terms of damage, loss of life, and required annual maintenance by leaving infrastructure, including bridge piers and docks, in unsafe conditions. A scouring event occurs during times of rapid river flow and icing conditions when sediment, including rocks, gravel, and silt, is transported by river currents away from bridge piers and similar structures. If the event is severe enough, foundation material below the pier footing may be eroded, leaving the structure unsupported and in jeopardy of collapse. Scour is dynamic, and ablation and deposition can occur simultaneously so the net effect cannot be easily predicted. Measurement of scour is therefore useful in monitoring stability and repair needs for bridges and other waterway structures before major damage occurs.

BRIEF DESCRIPTION OF THE RELATED ART

Currently, there are several techniques and devices used for detecting and monitoring scour, including subsurface interface radar, transducers, optical fathometers, physical probes, and visual inspection. All of these devices suffer from significant drawbacks.

Radar has been successfully employed to bathymetrically determine scour conditions. The technique is usually used after an event, indicating the final status of the sedimentation surrounding a pier. Sonar techniques have been similarly employed. Neither of these techniques are continuously employed in situ during a scour event and both require skilled operators to perform the test and interpret the results.

Neutral buoyancy "fish" equipped with a seismic transducer and a radio transmitter have been anchored at varying depths in the sediments around bridge piers (Zabilansky, L. J., *Ice Force and Scour Instrumentation for the White River*, Cold Regions Research and Engineering Laboratory, Hanover, N.H., Special Report 96-6, April 1996). As the fish are uncovered by the scouring process they are moved by the currents and they transmit signals to a receiver located on the shore that indicate that the scour has reached their tethered depth. During a depositional event, the fish are re-buried at approximately their original depth. While this system can be reset, it still provides a fairly crude spatial indication of the scour progression.

Various devices are known in the patented prior art for detecting and monitoring scouring. The U.S. Patent to Cinquino No. 4,855,966, for example, discloses a method and apparatus for monitoring bridge structures for scouring having apparatus for determining the distance between the topmost portion of the soil bed and one or more fixed points on a pier. In one embodiment of the invention, the distance determining apparatus comprises a sonar device for sonically determining the distance between the soil bed and a fixed point on the pier.

The U.S. Patent to Herbert No. 3,617,996, discloses an apparatus for scour detection at bridge piers and the like utilizing a plurality of electroacoustical transducers mounted on the structure to measure the effects of scouring on the soil bed adjacent to the structure.

Scouring measurement and detection utilizing time domain reflectometry (TDR) has been suggested in the literature (Dowding, C. H. and Pierce, C. E., *Use of Time Domain Reflectometry to Detect Bridge Scour and Monitor Pier Movement*, United States Department of Interior Bureau of Mines, Symposium and Workshop of Time Domain Reflectometry in Environmental, Infrastructure and Mining Applications, Northwestern University, Illinois, Sep. 7–9, 1994). However, the system described differs from the present invention in that it uses a sacrificial sensor buried vertically in the sediment. Once a section of the sensor is exposed by scouring, the current causes the exposed section to be broken off, shortening the sensor. This shortening of the sensor can be detected and measured by an on-shore instrument. The obvious drawback to this technique is that the sacrificial sensor, which is destroyed in the measurement process, must be replaced after every event.

Another drawback of current implementations is that they require a transmission line cable to be hard wired from the submerged sensor to a remotely located TDR measurement instrument. The cable is the weak link in the implementation. Significant labor and special structural means are required to install this cable and the cable remains vulnerable to being disturbed or destroyed by the effects of scour.

The present invention was developed in order to overcome these and other drawbacks of the prior devices by providing a bridge scour detection and monitoring device which takes advantage of the TDR technique for real-time measurement of sediment levels around a submerged structural member and eliminates the need for troublesome hard wiring between the sensor and TDR instrument. The apparatus includes an electrical pulse generator which produces and transmits a series of electrical pulses at predetermined intervals along transmission lines arranged adjacent to the area of concern.

When the transmission line passes through an interface of two different media, such as air/water or water/sediment, a dielectric constant boundary condition is set up along the transmission line. As an electrical pulse travels down such a transmission line, the boundary condition causes a portion of the energy of the traveling pulse to be reflected back toward the source while the rest of the energy continues along the line. The dielectric constant of the material surrounding the transmission line affects the propagation velocity of the pulse. The series of reflected portions of pulses form a signature signal which can be interpreted to calculate the position of the interfaces along the transmission line as a function of the time spacing of the reflected pulses and dielectric constants of the surrounding media. Knowledge of the positions of the interfaces over a change in time allows the user to detect and monitor the level of erosion caused by scouring.

SUMMARY OF THE INVENTION

Accordingly, a primary object of the present invention is to provide a real-time scour detection and monitoring system which uses time-domain reflectometry (TDR) to measure the level of sediment around the submerged portion of a structural member such as a bridge pier, dock, utility crossing, or the like. The apparatus includes an electrical pulse generator which transmits and receives a series of electrical pulses at a predetermined rate, a transmission line which is connected with the pulse generator, a timer to measure the travel time of the pulses, a transmitter to transmit a signal corresponding to the travel times, a receiver to receive the signal, and a signal analyzer connected with the receiver which interprets the travel time of the reflected pulses into the physical dimensions of the sensor above and below a dielectric interface boundary.

It is another object of the invention to provide a scour detection and monitoring system having an autonomous sensor with independent power supplies and using radio telemetry to communicate the scour conditions from the sensor to the surface instrumentation.

It is a further object of the invention to provide a bridge scour detection and monitoring system having an autonomous sensor with enough flexibility so that it is easily deployed and retrieved anywhere sediment transport rates are a concern without having to make modifications to the submerged foundation being monitored for proper installation.

It is another object of the invention to provide a scour detection and monitoring system built with relatively inexpensive instrumentation hardware which uses a robust permanent sensor arrangement deployed in an economical and easily implemented manner.

It is another object of the invention to provide a bridge scour detection and monitoring system with a real-time computer algorithm to compare an initial reference set of interface positions with a subsequently measured set of positions and to trigger an alarm when a significant change is observed in the TDR signature or when a threshold difference in position of interfaces over time occurs.

It is a further object of the invention to provide a bridge scour detection and monitoring system having minimal user interface, simple installation, and low maintenance due in part to the fact that the system has no moving or mechanical components.

BRIEF DESCRIPTION OF THE DRAWINGS

Other objects and advantages of the invention will become apparent from a study of the following specification when viewed in light of the accompanying drawings, in which.

DETAILED DESCRIPTION

Figure 1:
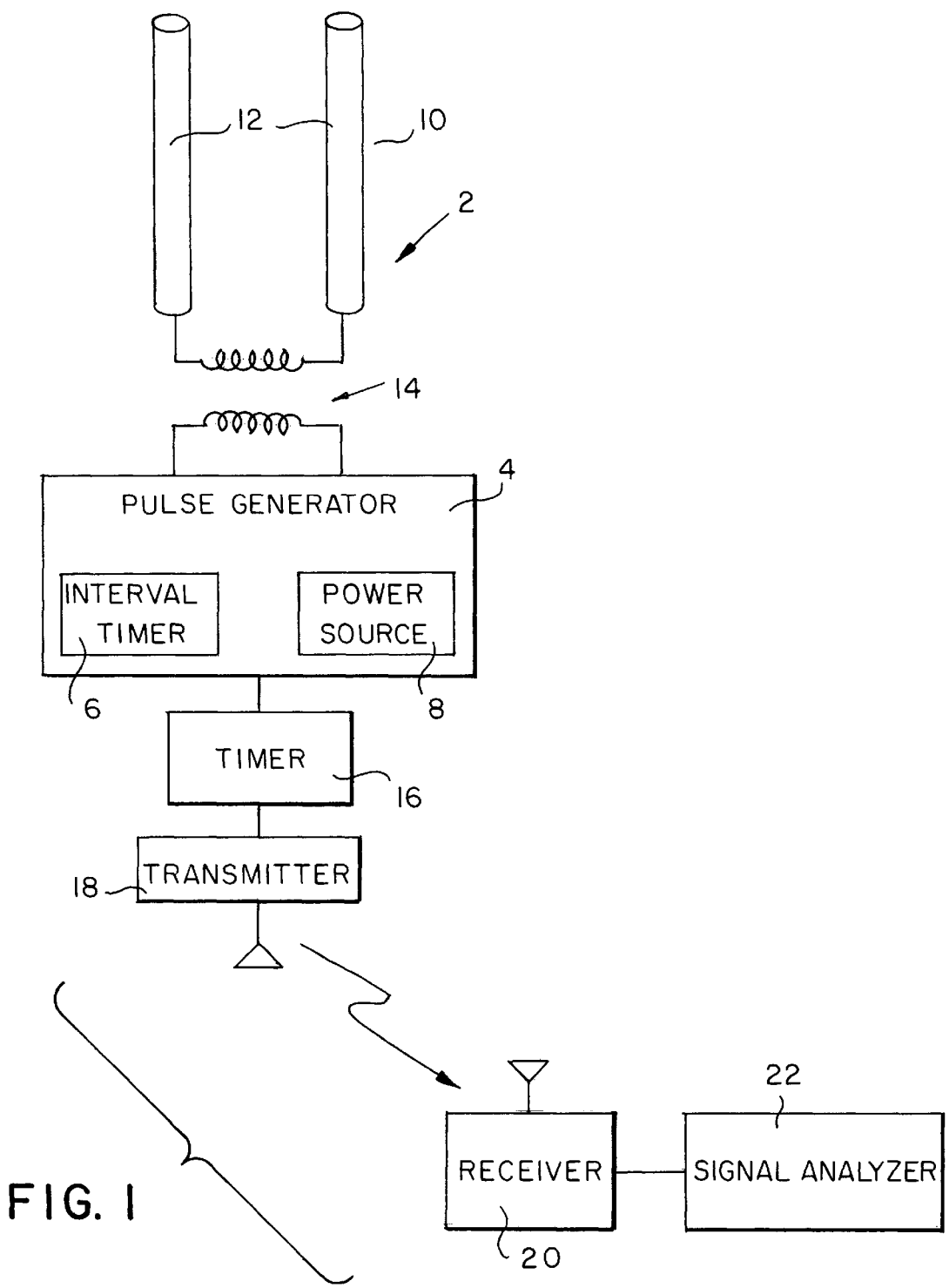
FIG. 1 is a schematic view of a sensor probe and TDR instrumentation according to the invention.

Referring now to FIG. 1, there is shown the scouring detection apparatus 2 according to the invention. The apparatus 2 includes a pulse generator 4 which is submerged in sediment beneath a body of water. The pulse generator 4 generates a plurality of electromagnetic pulses and includes an interval timer 6 for triggering the generation of pulses at a predetermined rate (i.e., once an hour). A power source 8 such as a battery is also included in the pulse generator 4 for its operation.

The scour monitoring apparatus further includes a sensor 10 arranged within the sedimentation bed for receiving and reflecting pulses from the pulse generator 4. The reflected pulses are a time-domain function of the properties of the surrounding media through which the sensor 10 passes. Preferably, the sensor 10 comprises a pair of parallel transmission rods 12 which are electrically coupled with the pulse generator 4 via a transformer 14. A timer 16 is connected with the pulse generator 4 for measuring the propagation time for each of the reflected pulses from the sensor 10. The propagation time is the time which elapses between the generation of a pulse from the pulse generator 4 and the reflection of that pulse from the sensor 10.

A transmitter 18 connected with the timer 16 transmits a radio signal corresponding with the propagation time between each generated and reflected pulse. A remote receiver 20 receives the transmitted signals and sends them to a signal analyzer 22 which processes the received signals, whereby changes between the generated and reflected pulses and in the elapsed propagation times thereof can be determined as a measure of the scour resulting from shifting of sediment and other material in the floor of the body of water.

Figure 2:
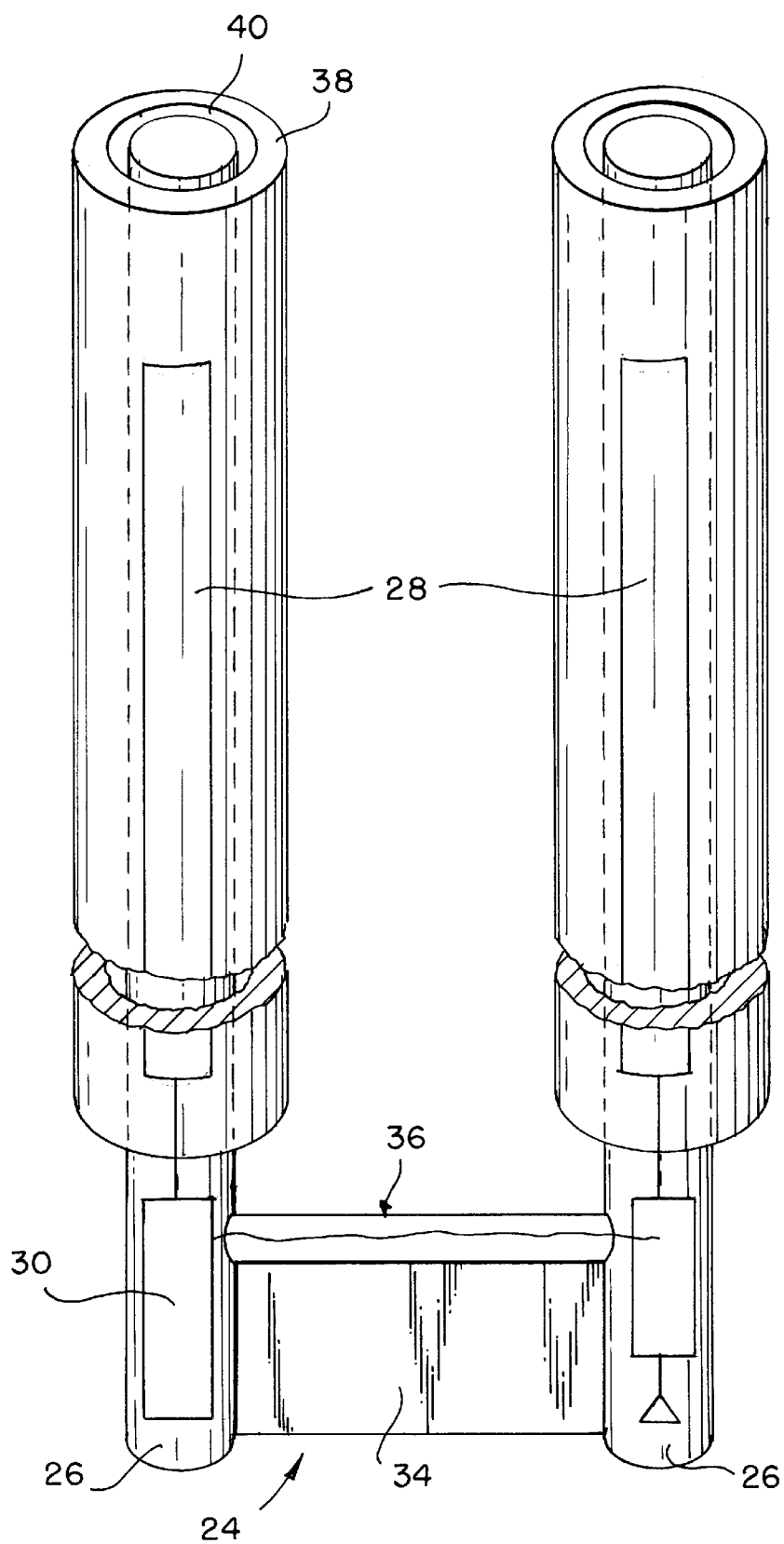
FIG. 2 is a detailed view of the sensor probe illustrating the frame and metal cylinder transmission lines according to the invention.

Referring now to FIG. 2, there is shown a preferred embodiment of the sensor 10 having a frame 24 with two hollow parallel tubes 26 made of a metal, plastic or fiberglass material. The tubes 26 are of a sufficient internal diameter to provide a volume large enough to internally accommodate a power source 28, TDR electronics 30, and a transmitter 32. The tubes 26 must be sufficiently strong to withstand external stresses due to river current and impact from materials moving in the currents. In the embodiment shown, the power source 28 is in the form of replaceable batteries that can power the IDR electronics 30 for upwards of one year of operation. The frame also includes a plate 34 and a conduit 36 on its lower portion for rigidly connecting the hollow tubes with each other. The conduit 36 also provides for the inter-connecting of the internal cavities of the hollow tubes 26 and the electronics therein.

Coaxially arranged about the upper portion of each of the hollow tubes 26 is a metal cylinder 38 that serves as a transmission line for the sensor probe. The metal cylinder 38 is electrically isolated from the supporting tubes 26 by an underlying coaxial layer of insulating material 40 such as plastic. The insulating material is unnecessary if the tube 26 is formed from an insulating substance such as plastic or fiberglass. Electronic connections from the TDR electronics 30 to the metal cylinder 38 are made in accordance with FIG. 1. In a typical implementation, the sensor would be approximately six feet long with 1.5 inch diameter sensor tubes having a center-to-center spacing of approximately six inches. These dimensions are approximate and can be adjusted in the commercial implementation to account for various factors including hydrodynamic forces, electromagnetic parameters, extent of scour extent expected, and to provide adequate internal housing space for batteries and electronics.

Figure 3:
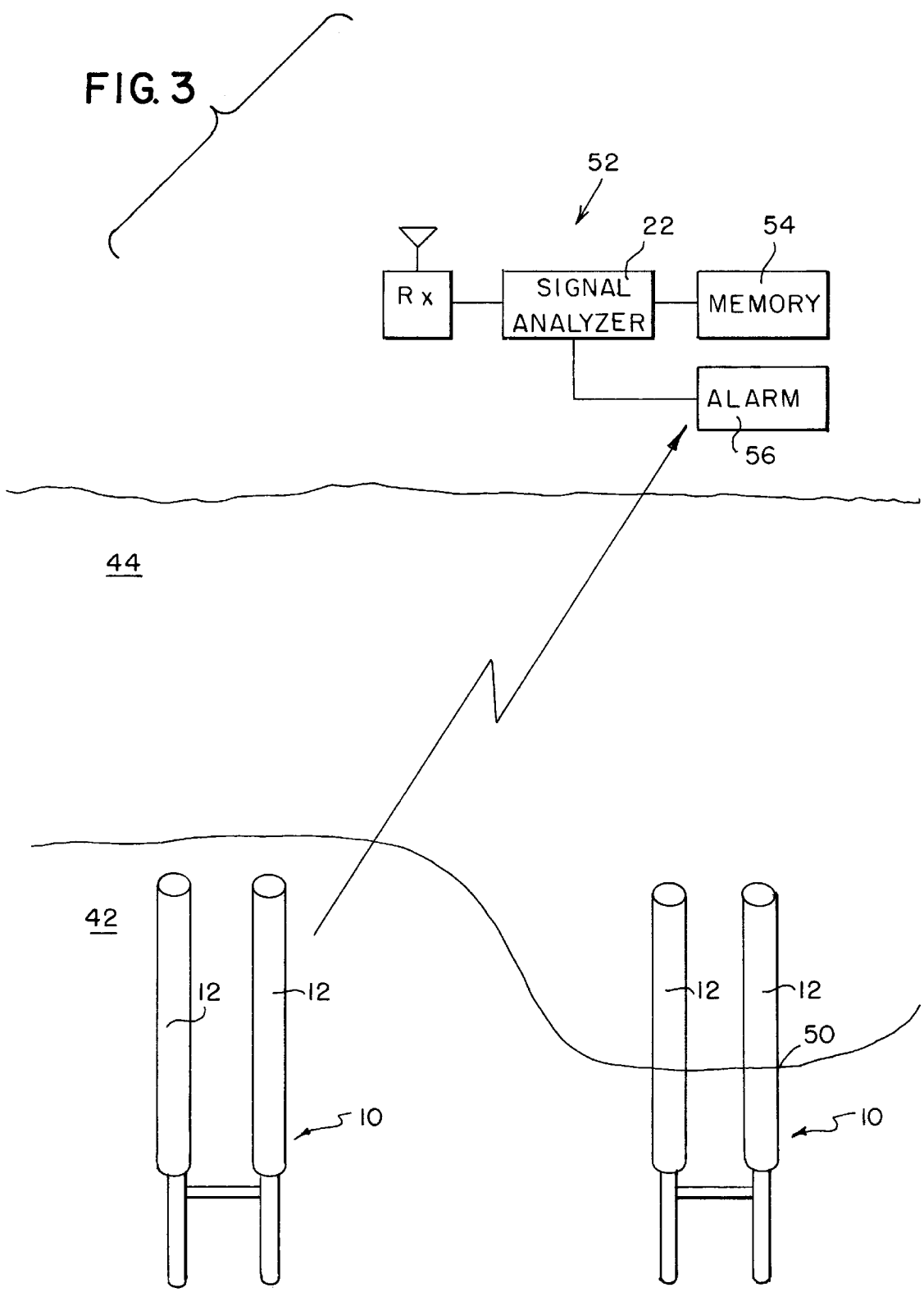
FIG. 3 is a schematic view illustrating the placement of sensor probes within the sediment floor of a body of water and the remotely located signal analyzer according to the invention.
Figure 4:
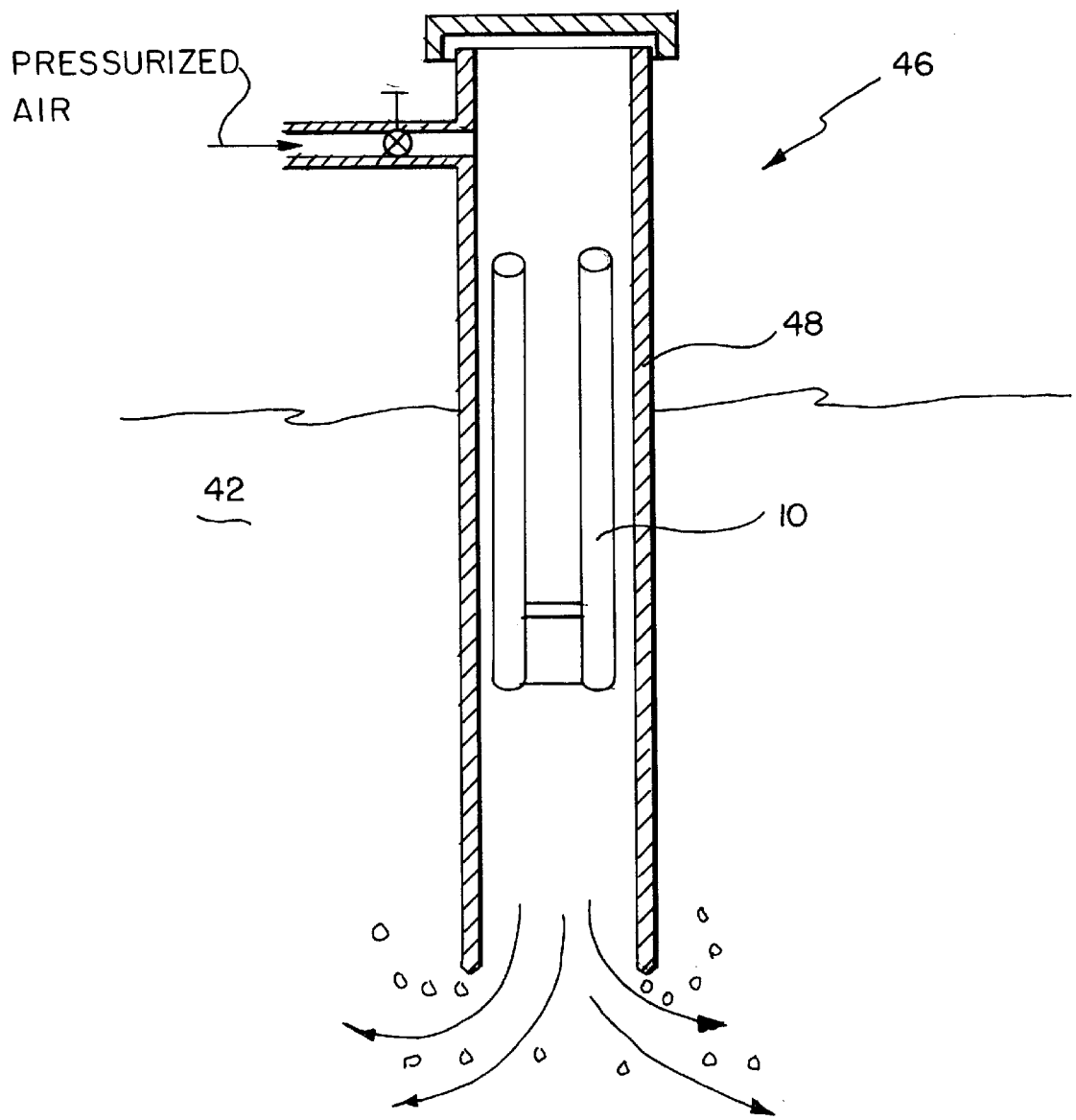
FIG. 4 is a schematic view illustrating the installation of a sensor probe within the sediment floor of a body of water using an air jet according to the invention.

An autonomous scour sensor 10, as shown in FIG. 3, may be strategically positioned vertically within a sediment layer 42 beneath a body of water 44 at a depth which would permit anchoring of the device in the sediment 42 below the expected limit of maximum scouring activity. As shown in FIG. 4, a typical method of positioning the sensor is to employ an airjet 46 to clear a path in the sediment through which a sensor 10 is lowered into position through the jet's drill shell 48. Pressurized air is delivered to an inlet on the jet and blows away sediment for insertion of the sensor. Afterwards, the drill shell 48 is removed and the sensor 10 remains in place.

Referring once again to FIG. 3, as scouring occurs and the sediment 42 erodes, the transmission lines 12 are exposed to the surrounding water 44 which causes an interface 50 to form along the transmission lines 12. The position of the developing interface 50 along the transmission lines 12 can be measured to determine the progression of scouring. A later scouring event may result in a favorable reshifting of the sediment 42 that will rebury the transmission lines 12 where they will rest until the next scouring event. The sensors 10 can be strategically placed in an array, enabling three-dimensional mapping of the effects of scour around a structure. By using a separate and unique telemetry channel frequency, each buried sensor 10 can periodically transmit data back to the remotely located surface instrumentation 52 without interfering with transmissions of the other probes.

Following installation of the system at a particular area of concern, an initial reference measurement of the interface position along each sensor 10 is taken by propagating an electrical pulse along the transmission lines 12. This initial reading is transmitted to the remotely located signal analyzer 22 where it is stored in a memory 54 included in the signal analyzer 22. Subsequent measurements of sets of interface positions are frequently taken and stored in the memory 54 to record the position of sediment level as a result of scouring over time. The signal analyzer also calculates the change over time in the measurement of the interface position between the initial reference set of interface positions and of subsequently measured sets of interface positions. The signal analyzer 22 can use a real time computer algorithm to compare multiple measurements of interface positions and also may trigger an alarm 56 when a significant change is observed or when a predetermined threshold difference between measurements of interface positions is exceeded.

While in accordance with the provisions of the Patent Statute the preferred forms and embodiments of the invention have been illustrated and described, it will be apparent to those of ordinary skill in the art that various changes and modifications may be made without deviating from the inventive concepts set forth above.

What is claimed is:

1. Apparatus for monitoring scouring of a bed of sediment beneath a body of water, comprising:
    (a) pulse generator means submerged in the sediment for generating a plurality of electromagnetic pulses, said pulse generator including an interval timer for triggering the generation of said electromagnetic pulses at a predetermined repetition rate;
    (b) sensor means electrically connected with said pulse generating means and arranged within the sedimentary bed for receiving and reflecting said electromagnetic pulses, the reflected pulses being a time-domain function of the properties of the surrounding media through which said sensor means passes;
    (c) timer means connected with said pulse generator means for measuring a propagation time for each of said reflected pulses, said propagation time being an elapsed time between corresponding generated and reflected pulses;
    (d) transmitter means connected with said timer means for transmitting radio signals corresponding to said propagation times;
    (e) receiver means arranged at a location remote from said transmitter means for receiving said transmitted signals; and
    (f) signal analyzer means connected with said receiver means for processing said transmitted signals, whereby changes between the generated and reflected pulses and in the elapsed propagation times thereof can be determined as a measure of the scour resulting from shifting of sediment and other material in the floor of the body of water.

2. Apparatus as defined in claim 1, wherein said sensor means comprises a pair of parallel transmission lines.

3. Apparatus as defined in claim 1, wherein said radio signal is transmitted using a standard telemetry technique.

4. Apparatus as defined in claim 1, wherein signal analyzer means includes a memory means for storing a plurality of measurements of scouring.

5. Apparatus as defined in claim 4, wherein said signal analyzer means calculates a change over time in said stored measurements of scouring between an initial reference measurement and a subsequent measurement of scouring.

6. Apparatus as defined in claim 5, wherein said signal analyzing means further includes an alarm, said alarm being triggered if said change over time between said stored measurements of scouring is greater than a predetermined threshold.

* * * * *